United States Patent [19]

Hoheisel et al.

[11] 4,243,712

[45] Jan. 6, 1981

[54] SHRINKABLE POLYETHYLENE TEREPHTHALATE FILM

[75] Inventors: Klaus Hoheisel; Seigfried Janocha, both of Wiesbaden, Fed. Rep. of Germany

[73] Assignee: Hoechst Aktiengesellschaft, Fed. Rep. of Germany

[21] Appl. No.: 973,997

[22] Filed: Dec. 28, 1978

Related U.S. Application Data

[63] Continuation of Ser. No. 848,685, Nov. 4, 1977, abandoned, which is a continuation of Ser. No. 640,723, Dec. 15, 1975, abandoned.

[30] Foreign Application Priority Data

Dec. 20, 1974 [DE] Fed. Rep. of Germany ....... 2460394

[51] Int. Cl.$^3$ .............................................. F16L 11/06
[52] U.S. Cl. ................................. 428/35; 264/290.2; 428/480; 428/910; 428/36; 525/444; 138/118

[58] Field of Search ................. 428/35, 480, 910, 36; 264/289; 260/860; 525/444; 138/118

[56] References Cited

U.S. PATENT DOCUMENTS

| | | | |
|---|---|---|---|
| 2,465,319 | 3/1949 | Whinfield | 264/210 F |
| 2,876,067 | 3/1959 | Nagel | 428/910 |
| 3,187,075 | 6/1965 | Siefried | 264/289 |
| 3,256,379 | 6/1966 | Heffelfinger | 264/289 |
| 3,423,281 | 1/1969 | Weiner | 428/480 |
| 3,446,886 | 5/1969 | Karickoff | 264/289 |
| 3,455,720 | 7/1969 | Davies | 428/910 |
| 3,953,394 | 4/1976 | Fox | 260/40 R |

*Primary Examiner*—Ellis P. Robinson
*Attorney, Agent, or Firm*—James E. Bryan

[57] ABSTRACT

This invention relates to a stretched shrinkable film of polyethylene terephthalate containing about 2 to 35 percent by weight of polybutylene terephthalate.

7 Claims, No Drawings

SHRINKABLE POLYETHYLENE TEREPHTHALATE FILM

This is a continuation of application Ser. No. 848,685, filed 11-4-77, in turn, a continuation of Ser. No. 640,723, filed 12/15/75 now abandoned.

The present invention relates to a polyethylene terephthalate film stretched biaxially according to the stenter stretching process or longitudinally and multiaxially at the circumference according to the tube stretching process. The film has an improved shrinkage and, simultaneously, an earlier shrinkage start, compared to films of the prior art.

The manufacture of shrinkable films of polyethylene terephthalate has long been part of the prior art. According to the known stenter stretching process, extruded flat films are stretched at the corresponding stretching temperatures at an area stretching ratio of up to 15 in most cases, the processes with transverse/longitudinal stretching as well as those with longitudinal/transverse stretching belonging to the prior art.

According to the known tube stretching processes, the films exiting a round die are stretched longitudinally and simultaneously, in most cases by inflation by means of a gas stretched multiaxially at the circumference.

The films manufactured in this manner are used as packaging films in many fields of application, e.g. as flat films for shrink-packaging food or as bags having only one bottom seam. For many purposes of use, film shrinkage of approximately 15 percent at 90° C. and a shrinkage start at approximately 75° C. are entirely sufficient when shrinkage tunnels are used, for example. If, however, the manufacture of the shrunk packages is performed by means of heated liquids, for example, difficulties arise with respect to the relatively high temperatures. When poultry, game parts, etc., are shrink-packaged, for example, the achievable shrinkage often is not sufficient to achieve tight contact of the film with the wrapped material, which imparts an unpleasant appearance to the wrapping. Furthermore, many foodstuffs, e.g. boiled ham or fresh meat, must be shrink-packaged at temperatures as low as possible so that they are not damaged or do not have an unpleasant appearance.

The present invention provides a polyethylene terephthalate film stretched biaxially according to the stenter stretching process or longitudinally and multiaxially at the circumference, which film has an earlier shrinkage start and a higher absolute shrinkage than does a conventional film of polyethylene terephthalate. On the other hand, shrinkage must not begin too early so that the storability of the film, e.g. in the summer months, is still ensured. Simultaneously, the film must be easily weldable, e.g. by hot-wire welding, infrared or flame welding.

The shrinkable film of polyethylene terephthalate has the characteristic feature that it contains 2 to 35 percent by weight of polybutylene terephthalate.

Thermoplastic shaping materials of a linear saturated polyester produced from aromatic dicarboxylic acids and aliphatic or cycloaliphatic diols and 2 to 20 percent by weight of polyalkylene diols are known from German Offenlegungsschrift No. 1,720,723, but they are used for the manufacture of injection moulded articles. As the linear polyester component, there are also used modified polyethylene terephthalates which, in addition to ethylene glycol, also contain butane diol-1,4 as the glycolic component.

The German Offenlegungsschrift, supra, does not disclose the manufacture of films or particularly shrinkable films; it instead leads away from the solution of the problem of the present invention since it discloses, as a particular advantage of the thermoplastic materials, their dimensional stability and their complete unshrinkability.

Considering the teaching of the German Offenlegungsschrift, supra, the present invention also is surprising because polybutylene terephthalate has a particularly high crystallization tendency, a high crystallinity corresponding to a good dimensional stability, and thus it could not be expected that the addition of polybutylene terephthalate would lead to particularly good shrinkage properties of the film of the invention.

The polybutylene terephthalate may be added to the already prepared polyethylene terephthalate or to the polycondensation mixture for the polyethylene terephthalate or as a copolyester during polycondensation of the polyethylene terephthalate by a corresponding addition of butane diol.

Preferably, the portion of polybutylene terephthalate is in the range from 5 to 15 percent by weight.

The film may be a biaxially stretched film which has been stretched longitudinally/transversely or transversely/longitudinally or also simultaneously in both directions. Preferable, however, is a longitudinally/transversely stretched film.

In particular, however, the film is a seamless tubular film stretched longitudinally and multiaxially at the circumference according to the known tube stretching process, since particularly preferred bags with only one bottom welded seam can be produced therefrom.

The film stretching ratios of the stretched films range up to a maximum of 20, the area stretching ratio of the flat films preferably being in the range between 8 and 12 and that of the tubular films preferably being in the range between 10 and 16.

The films of the invention shrink earlier than films of polyethylene terephthalate, shrinkage beginning preferably below 70° C. Absolute shrinkage in the orthogonal directions at 75° C. is above 8 percent, preferably above 10 percent.

The film of the invention will be further illustrated by reference to the following specific examples.

EXAMPLE 1

Polyethylene terephthalate is melted by means of an extruder and extruded at 285° C. through a slot die of 1,500 mm. The melt is then cooled to 30° C. on a rotating cooling roller and then biaxially (longitudinally/transversely) stretched at the usual stretching temperatures of 85° or 100° C. at an area stretching ratio of 12 and then cooled under tension to room temperature (25° C.) and wound up. The film has a thickness of 20 μm.

EXAMPLE 2

The process conditions are the same as in Example 1 but, instead of pure polyethylene terephthalate, there is used a prepared mixture of 92.5 percent by weight of polyethylene terephthalate and 7.5 percent by weight of polybutylene terephthalate.

EXAMPLE 3

The process conditions are the same as in Example 1 but, instead of pure polyethylene terephthalate, there is used a prepared mixture of 90 percent by weight of polyethylene terephthalate and 10 percent by weight of polybutylene terephthalate.

EXAMPLE 4

The process conditions are the same as in Example 1 but, instead of pure polyethylene terephthalate, there is used a copolyester composed of 90 percent by weight of polyethylene terephthalate and 10 percent by weight of polybutylene terephthalate. The copolyester is prepared by a corresponding use of ethylene glycol and butane diol during polycondensation with terephthalic acid.

EXAMPLE 5

Polyethylene terephthalate is extruded at 285° C. from an annular die of a diameter of 30 mm, solidified to form a film of 320 μm thickness by means of a water-cooled metal mandrel arranged in the interior of the tube, stretched longitudinally at 85° C. by more rapidly running squeeze roller pairs and simultaneously multiaxially at the circumference by inflation by means of air pumped into the interior of the tube at a pressure of 3,000 kg/m$^2$. The area stretching ratio is 16.

The tube is cooled under tension to room temperature (25° C.) and then wound up. The film has a thickness of 20 μm.

EXAMPLES 6, 7, and 8

The process conditions are the same as in Example 5 but the basic materials used are those stated in Examples 2, 3, and 4.

The following table shows the values determined for shrinkage start and absolute shrinkage. Shrinkage is determined by immersing in water for 15 seconds a piece 10 cm in length and 10 cm in width, which, in the case of the tube, corresponds to the width of the flattened tube, and subsequent measurement of the shrinkage.

Since transverse shrinkage and longitudinal shrinkage are almost the same, the mean value is determined which is stated in the table.

TABLE 1

| Example | 1 | 2 | 3 | 4 | 5 | 6 | 7 | 8 |
|---|---|---|---|---|---|---|---|---|
| Shrinkage in %, at 70° C. | — | 12 | 16 | 16 | — | 12.5 | 15.5 | 16 |
| Shrinkage in %, at 90° C. | 21 | 25 | 31 | 32 | 20 | 26 | 32 | 31.5 |
| Shrinkage start, °C. | 78 | 58 | 56 | 55 | 77 | 58 | 56 | 56.5 |

From the materials of Examples 5 and 7, tubular films of a diameter of 165 mm are produced from which bags are prepared by infrared welding of the bottom. For this purpose, there is used a welding apparatus according to German Offenlegungsschrift No. 2,244,214. The mean bursting pressure determined by inflation of the bags until they burst is stated in Table 2.

TABLE 2

| Material of Example | 5 | 7 |
|---|---|---|
| Mean bursting pressure in bars | 0.27 | 0.37 |
| Standard deviation in bars | 0.11 | 0.08 |

The test results show that the films of the invention have the desired low shrinkage start as well as a substantially higher shrinkage. The bursting pressures of the bags produced from the tubular films of the invention are also improved, the bursting pressure being a measure of the quality of welding, i.e. of the weldability.

The other good properties of stretched polyethylene terephthalate films, e.g. tear strength, transparency, etc. have been completely maintained or are only insignificantly different.

It will be obvious to those skilled in the art that many modifications may be made within the scope of the present invention without departing from the spirit thereof, and the invention includes all such modifications.

What is claimed is:

1. A stretched shrinkable film comprising a mixture of polyethylene terephthalate and about 2 to 35 percent by weight of polybutylene terephthalate, said film having a shrinkage which begins below 70° C. and is above 8 percent at 75° C.

2. A film according to claim 1 which contains 5 to 15 percent by weight of polybutylene terephthalate.

3. A film according to claim 1 which is a biaxially stretched flat film.

4. A film according to claim 3 which is a longitudinally/transversely stretched flat film.

5. A film according to claim 1 which is a seamless tubular film stretched in the longitudinal direction and multiaxially at the circumference.

6. A film according to claim 1 which has an area stretching ratio of up to 20.

7. A welded bag made from a film according to claim 1.

* * * * *